United States Patent
Morse et al.

(10) Patent No.: US 10,902,059 B2
(45) Date of Patent: *Jan. 26, 2021

(54) SYSTEM AND METHOD FOR ACCESSING, STORING, AND RENDERING DIGITAL MEDIA CONTENT USING VIRTUAL BROADCAST CHANNELS

(71) Applicant: CREATIVE TECHNOLOGY LTD., Singapore (SG)

(72) Inventors: Lee Morse, Sunnyvale, CA (US); Vincent Tong, Singapore (SG); Brook Leonard Eaton, Mountain View, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,554

(22) Filed: Jan. 18, 2019

(65) Prior Publication Data

US 2019/0155841 A1 May 23, 2019

Related U.S. Application Data

(63) Continuation of application No. 14/886,498, filed on Oct. 19, 2015, now abandoned, which is a
(Continued)

(51) Int. Cl.
*G06F 16/638* (2019.01)
*H04L 29/08* (2006.01)
(Continued)

(52) U.S. Cl.
CPC .......... *G06F 16/639* (2019.01); *G06F 3/0482* (2013.01); *G06F 16/686* (2019.01);
(Continued)

(58) Field of Classification Search
CPC .... G06F 16/639; G06F 16/686; G06F 3/0482; H04L 29/08072; H04L 29/0809; H04L 67/06; H04L 67/36; H04L 29/06; H04N 21/4384; H04N 21/439; H04N 21/8113; H04N 21/8133; H04N 21/8456
(Continued)

(56) References Cited

U.S. PATENT DOCUMENTS 6,667,751 B1   12/2003   Wynn et al.
7,020,704 B1   3/2006    Lipscomb et al.
(Continued)

OTHER PUBLICATIONS

"U.S. Appl. No. 11/059,750, Examiner Interview Summary dated May 19, 2015", 2 pgs.
(Continued)

*Primary Examiner* — Joseph L Greene
(74) *Attorney, Agent, or Firm* — Russ Swerdon; Desmund Gean

(57) ABSTRACT

A user interface device provides access to at least one of a plurality of digital content sources. The interface device is configured to catalog the plurality of digital content sources to correspond to a plurality of channels in a tuning band, to present the plurality of channels sequentially in response to a user initiated tuning movement, and to select one of the sequentially presented channels for playback.

20 Claims, 8 Drawing Sheets

US 10,902,059 B2

Page 2

Related U.S. Application Data continuation of application No. 11/059,750, filed on Feb. 16, 2005, now Pat. No. 9,219,634.

(51) Int. Cl.
| | | |
|---|---|---|
| *G06F 16/68* | (2019.01) | |
| *H04N 21/438* | (2011.01) | |
| *H04N 21/439* | (2011.01) | |
| *H04N 21/81* | (2011.01) | |
| *H04N 21/845* | (2011.01) | |
| *G06F 3/0482* | (2013.01) | |
| *H04L 29/06* | (2006.01) | |

(52) U.S. Cl.
CPC .... *H04L 29/0809* (2013.01); *H04L 29/08072* (2013.01); *H04L 67/06* (2013.01); *H04L 67/36* (2013.01); *H04N 21/439* (2013.01); *H04N 21/4384* (2013.01); *H04N 21/8113* (2013.01); *H04N 21/8133* (2013.01); *H04N 21/8456* (2013.01); *H04L 29/06* (2013.01)

(58) Field of Classification Search
USPC .......................................................... 709/217
See application file for complete search history.

(56) References Cited

U.S. PATENT DOCUMENTS

| | | |
|---|---|---|
| 9,219,634 B1 | 12/2015 | Morse et al. |
| 2002/0049717 A1 | 4/2002 | Routtenberg et al. |
| 2002/0089529 A1* | 7/2002 | Robbin ................ G11B 27/105 715/716 |
| 2002/0184195 A1* | 12/2002 | Qian .................... G06F 16/9535 |
| 2003/0043185 A1 | 3/2003 | Kake et al. |
| 2004/0199657 A1* | 10/2004 | Eyal ........................ H04L 65/60 709/231 |
| 2004/0202335 A1* | 10/2004 | Lee ...................... G11B 27/105 381/86 |
| 2004/0243567 A1* | 12/2004 | Levy ........................ G06F 21/10 |
| 2005/0045025 A1 | 3/2005 | Wells et al. |
| 2008/0313222 A1 | 12/2008 | Vignoli et al. |
| 2016/0055239 A1 | 2/2016 | Morse et al. |

OTHER PUBLICATIONS

"U.S. Appl. No. 11/059,750, Examiner Interview Summary dated Jun. 4, 2015", 2 pgs.

"U.S. Appl. No. 11/059,750, Examiner Interview Summary dated Nov. 6, 2014", 3 pgs.

"U.S. Appl. No. 11/059,750, Non Final Office Action dated Feb. 11, 2015", 20 pgs.

"U.S. Appl. No. 11/059,750, Notice of Allowance dated Jun. 4, 2015", 14 pgs.

"U.S. Appl. No. 14/886,498, Non Final Office Action dated Mar. 20, 2018", 11 pages.

* cited by examiner

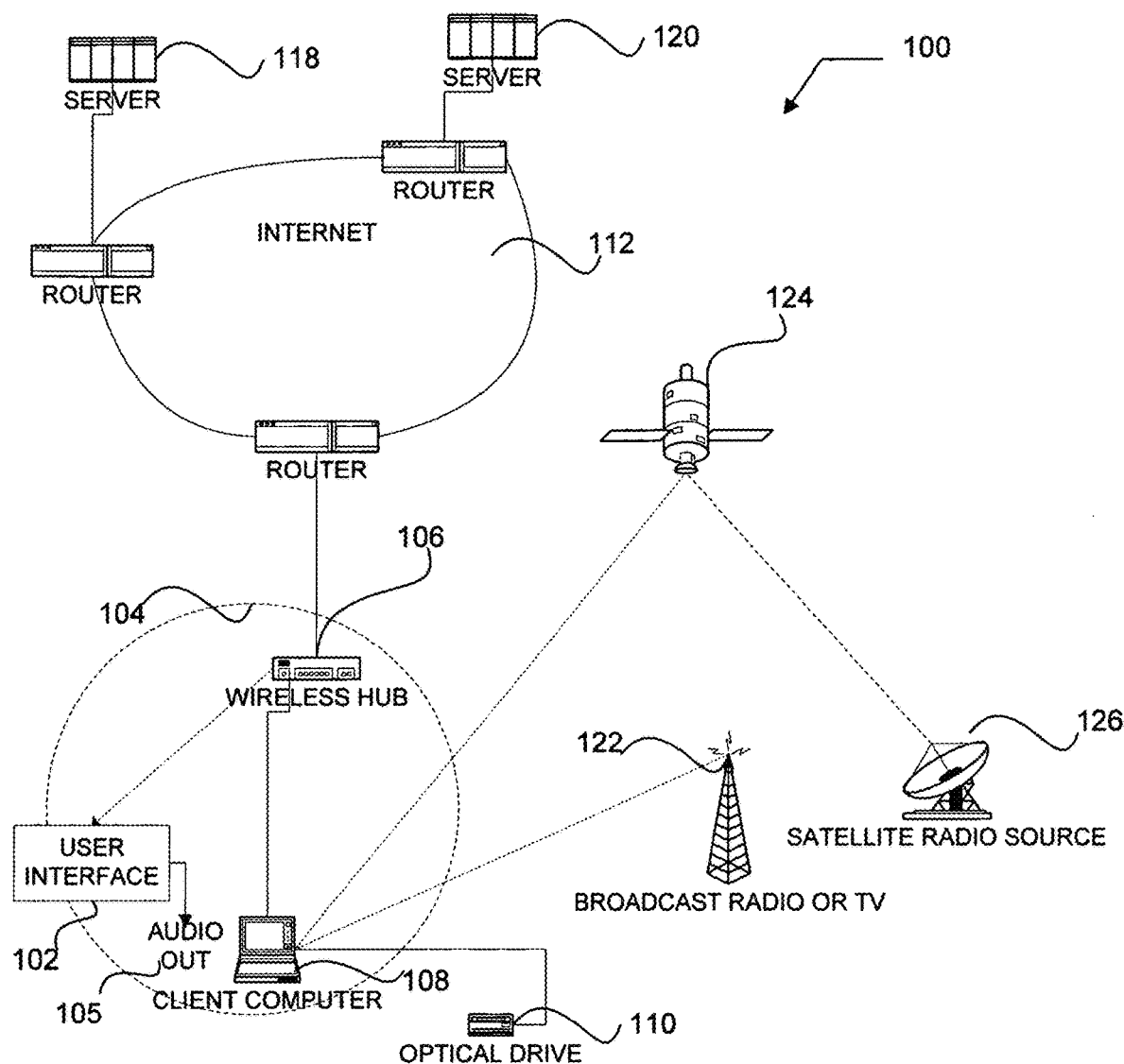
Fig._1A

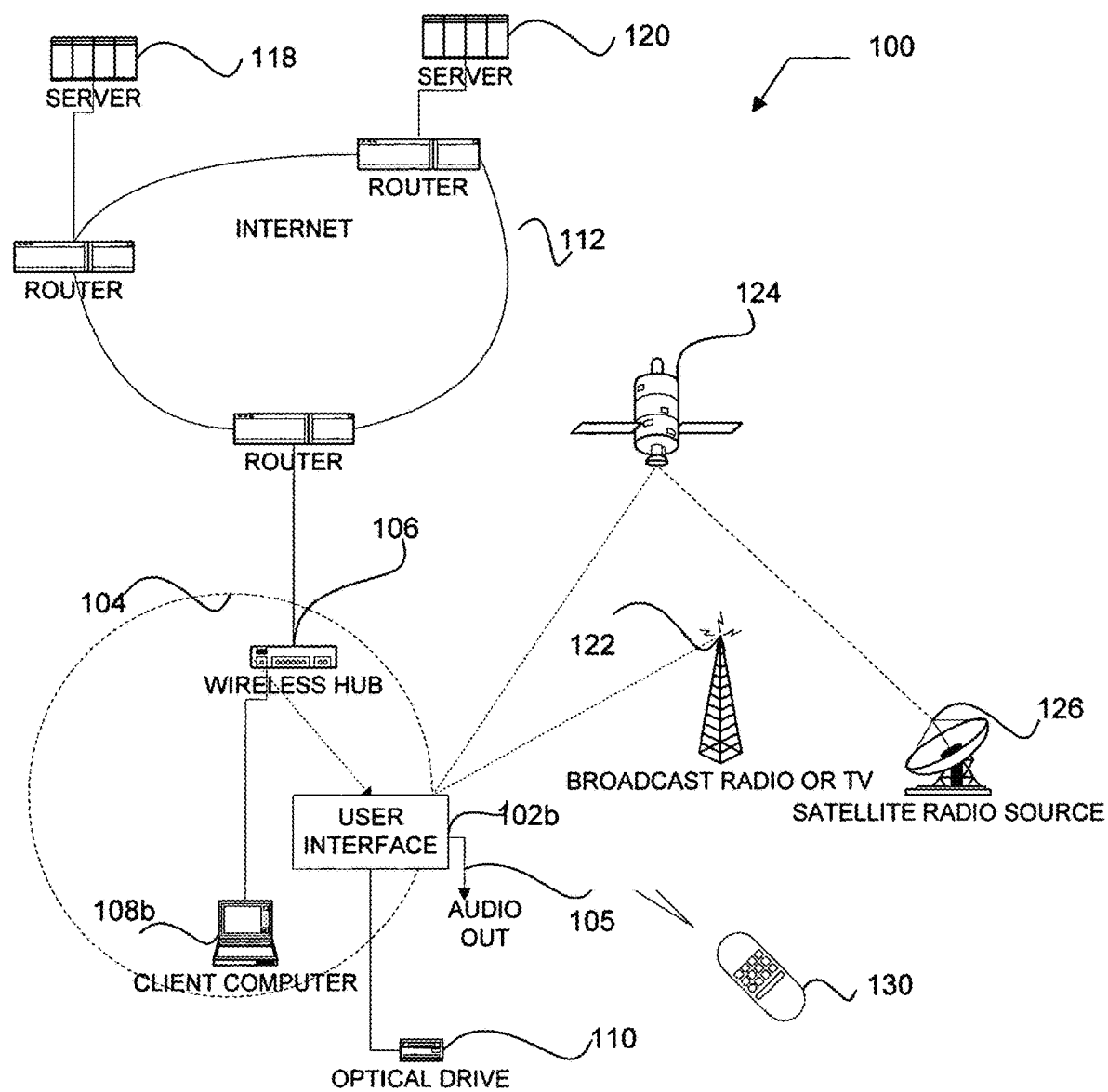
Fig._1B

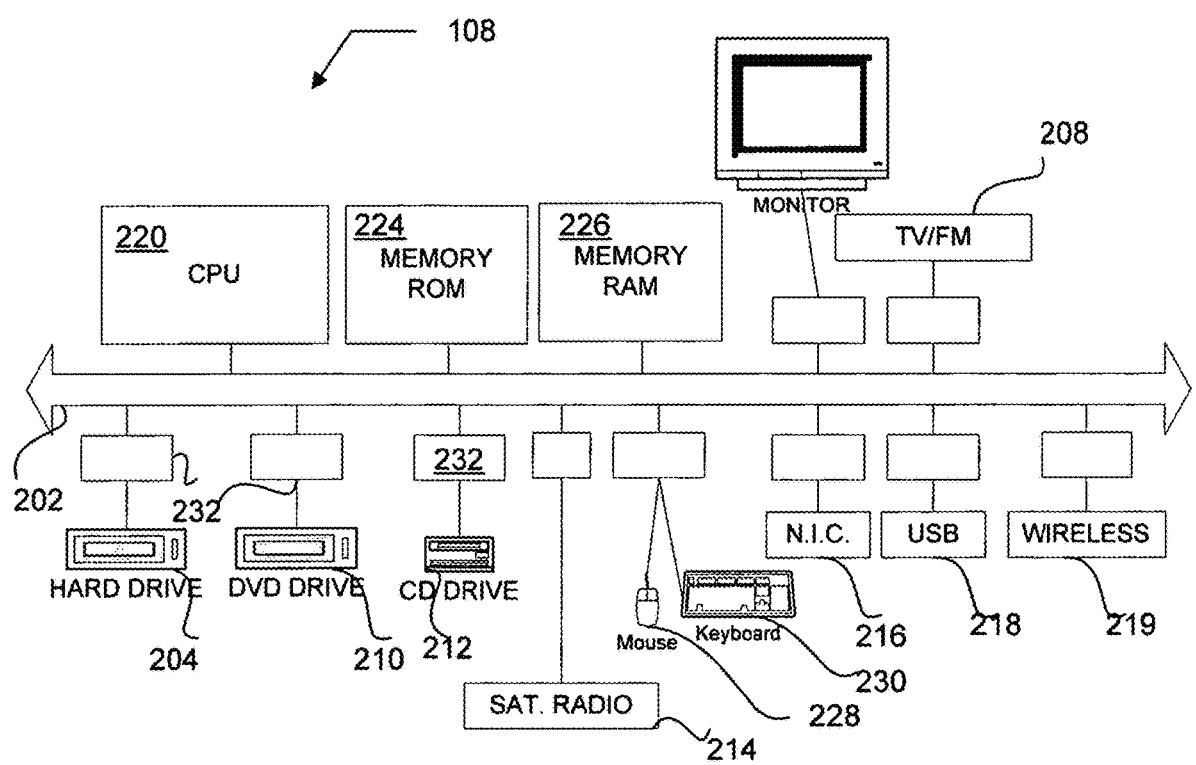
Fig._2

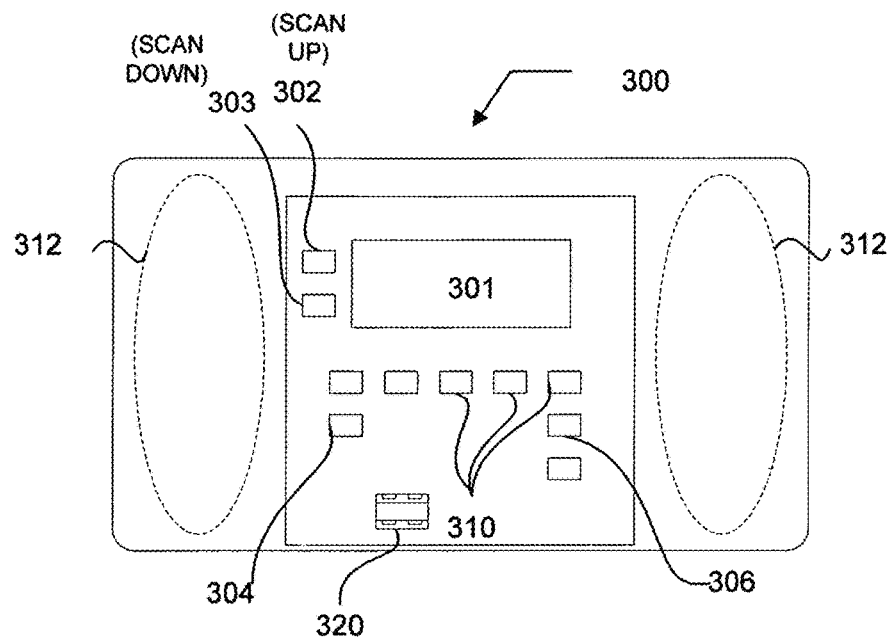
*Fig._3*
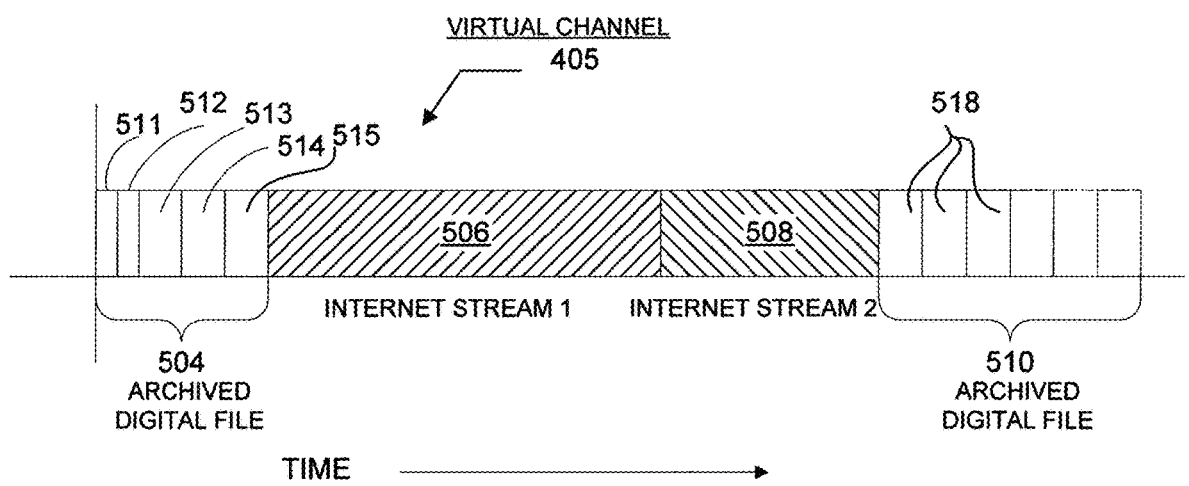
*Fig._5*

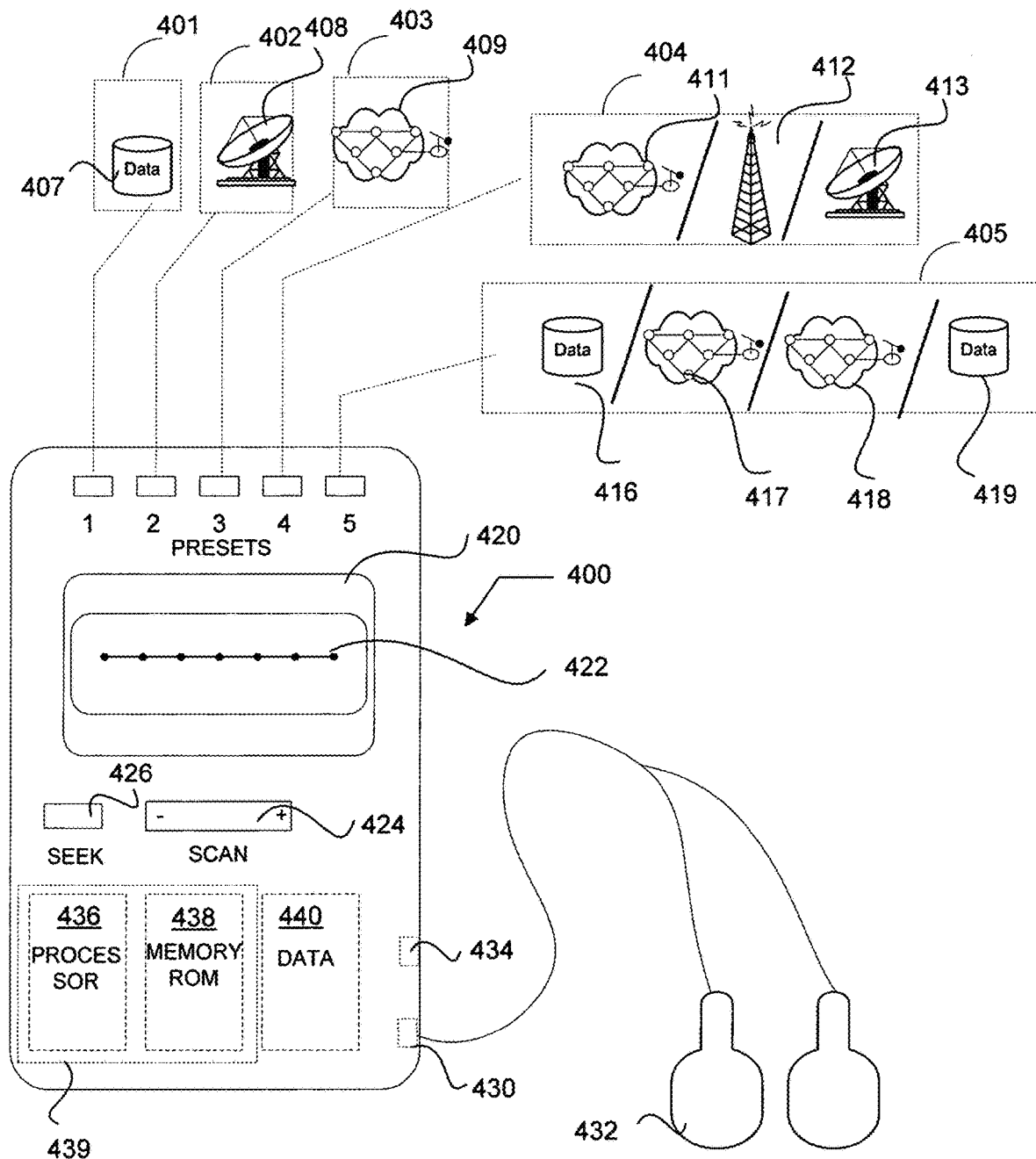
Fig._4

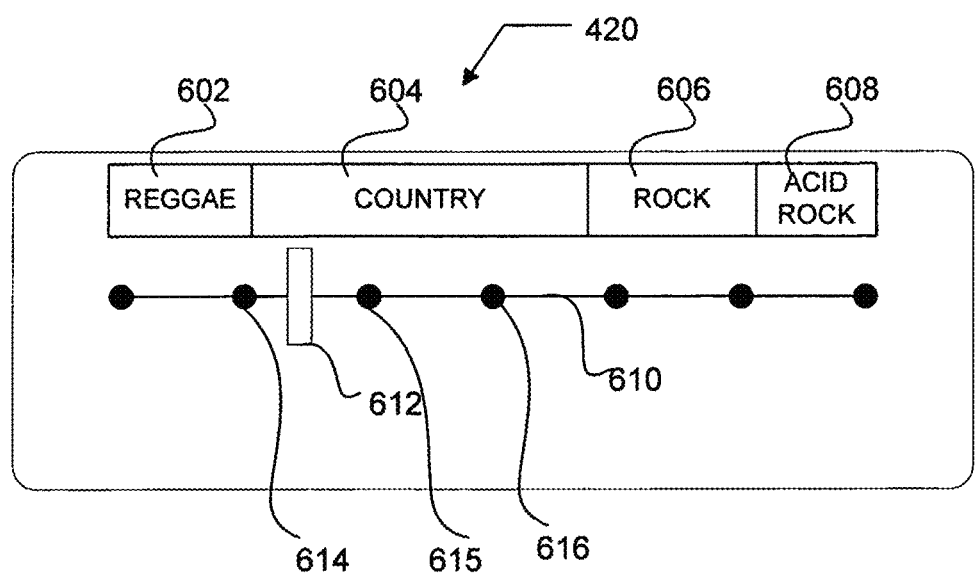
Fig._6

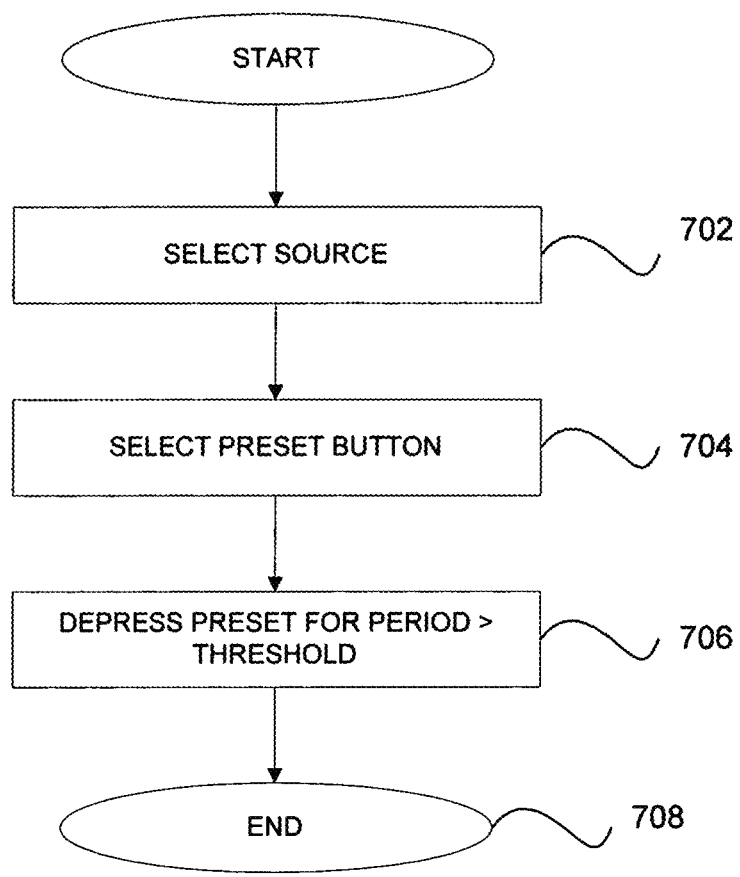
Fig._7

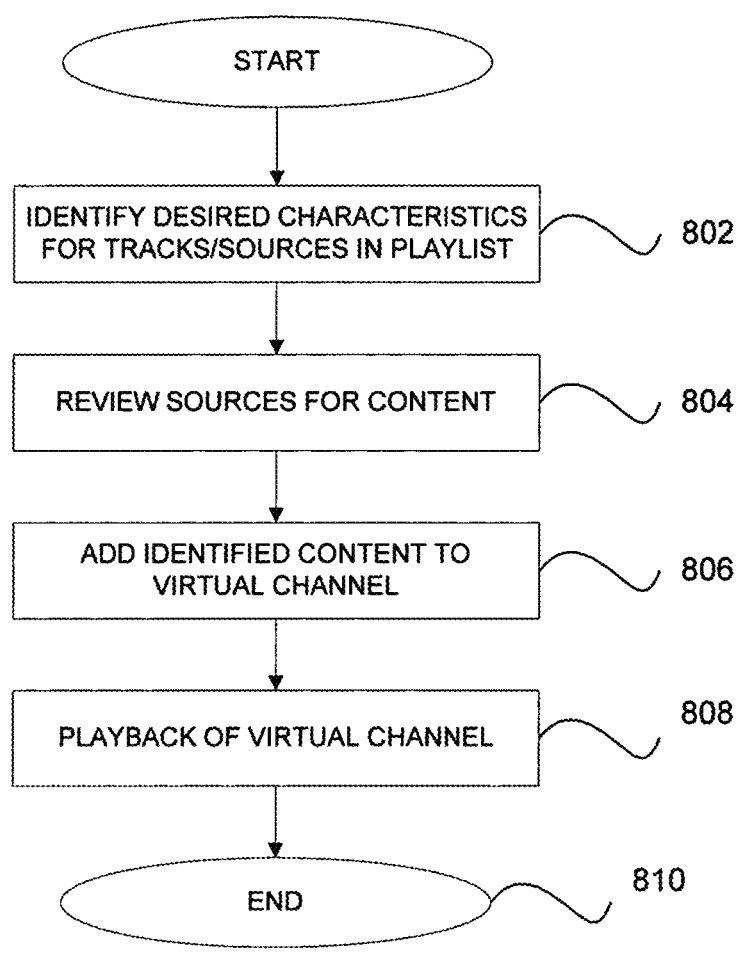
Fig._8

SYSTEM AND METHOD FOR ACCESSING, STORING, AND RENDERING DIGITAL MEDIA CONTENT USING VIRTUAL BROADCAST CHANNELS

CROSS-REFERENCE TO RELATED APPLICATION

This application is a continuation of U.S. patent application Ser. No. 14/886,498, filed Oct. 19, 2015 and entitled, "SYSTEM AND METHOD FOR ACCESSING, STORING, AND RENDERING DIGITAL MEDIA CONTENT USING VIRTUAL BROADCAST CHANNELS" which is a continuation of U.S. patent application Ser. No. 11/059,750, filed Feb. 16, 2005 now U.S. Pat. No. 9,219,634 Issued on Dec. 22, 2105 and entitled, "SYSTEM AND METHOD FOR SEARCHING, STORING, AND RENDERING DIGITAL MEDIA CONTENT USING VIRTUAL BROADCAST CHANNELS", the entirety of which is incorporated by reference for all purposes.

BACKGROUND OF THE INVENTION

1. Field of the Invention

The present invention relates to digital media products. More particularly, the present invention relates to interfaces for accessing digital music content.

2. Description of the Related Art

Digital content has evolved dramatically in terms of scope and prevalence over the past several years. For example, analog sources such as vinyl records played back on turntable playback units have been substantially replaced by portable CD ROM players or personal portable players having MP3 (Motion Picture Experts Group, Audio Layer III) and other audio digital file playback capabilities. Recently, personal portable players have seen increasing popularity. Portable media players typically download digital files from a client computer. In the process of downloading, the personal players have experienced a first level of filtering. That is, personal players typically employ a flash memory or other memory storage device and require the downloading of digital content into the memory. In most cases, the user is responsible for selecting the music for downloading and hence filters the available music to store only digital content in which he has an interest.

In contrast, the digital content often found on some electronic device such as personal computers experience only minor forms of filtering. For example, a home computer or home computer network may be accessed by a number of different individuals residing in the home, all having varying entertainment tastes and preferences. Accordingly, accessing a particular class of media tracks requires some form of filtering. That is, many of the tracks stored by other users for the particular home computer or network may have little relevance to other users. In such a case finding tracks for playback involves an often-frustrating level of searching through a large directory of tracks. Even portable MP3 players with hierarchical navigation may still benefit from further filtering.

Moreover, different users have different levels of comfort with technology. For example, there are many "passive" listeners, such as those who desire only a high level of filtering. They may care only about listening to a particular genre and care little if at all about the particular songs being played within that genre. For them, searching for individual tracks hidden among a larger group of tracks may provide even greater levels of frustration.

Recognizing the different degrees of sophistication of users and their comfort levels with technology, what is needed is an interface system that is adaptable to the different levels of interest, preference, and comfort with technology. It is therefore desirable to provide an improved user interface that provides easy access to tracks filtered for the user and customizable by the user.

SUMMARY OF THE INVENTION

The present invention provides a user interface device for accessing one of a plurality of digital content sources. The digital content sources are mapped to a plurality of virtual broadcast stations in a virtual broadcast tuning band. The virtual band may comprise the virtual stations either alone or combined with actual broadcast stations from conventional satellite or terrestrial sources. By mapping the digital media files to the virtual stations, navigation is provided in a familiar form for users.

According to one embodiment, a user interface for selecting and accessing one of a plurality of digital media files includes a processor that associates the media files with a plurality of channels. Each channel has at least one digital media file associated with it and is assigned to a location within a virtual band. A selection mechanism provides a tuning movement that plays back the digital media content when the respective location (i.e., the virtual channel) within the virtual tuning band is accessed. The selection mechanism includes a linear radio dial displayed on a display screen with an indicator indicating the location within the virtual band. Metadata relating to the content of the digital media files is used to form a hierarchy of metadata information, the metadata being used in the ordering of the virtual channels in the virtual band.

According to another embodiment, a user interface device for accessing at least one of a plurality of digital media files by a tuning movement in a tuning band having a plurality of virtual channels is provided. The interface device includes a processor configured to associate the plurality of digital media files with the plurality of virtual channels, each of the virtual channels having at least one digital media file associated with it. The processor is further configured to assign each of the virtual channels to a corresponding location in the tuning band. A selection mechanism is configured to select a first virtual channel from the plurality of virtual channels for playback in response to the tuning movement to a first location in the tuning band corresponding to the first virtual channel. Rendering and playback of the first virtual channel occurs automatically in response to the tuning movement to the first location corresponding to the virtual channel. The plurality of virtual channels in the tuning band comprises a plurality of playlists, each containing a plurality of locally stored digital media files.

According to a further embodiment, a user interface device is configured to access one of a virtual channel and a broadcast channel by a tuning movement in a tuning band having a plurality of virtual channels and at least one broadcast channel. The broadcast channel is one or more of a terrestrial or satellite broadcast channel. The interface device includes a processor configured to associate the plurality of digital media files with the plurality of virtual channels, each of the virtual channels having at least one digital media file associated with it. The processor is further configured to assign each of the virtual channels to a corresponding location in the tuning band. A selection mechanism is configured to select a first virtual channel from the plurality of virtual channels for playback in response to the tuning movement to a first location in the tuning band corresponding to the first virtual channel and to playback the broadcast channel in response to a tuning movement to a location corresponding to the broadcast channel. Rendering and playback of the first virtual channel occurs automatically in response to the tuning movement to the first location corresponding to the virtual channel. The plurality of virtual channels in the tuning band comprises a plurality of playlists, each containing a plurality of locally stored digital media files.

According to a still further embodiment, the user interface device is configured to access one of a virtual channel and a broadcast channel by a tuning movement in a tuning band having a plurality of virtual channels and at least one broadcast channel. The plurality of virtual stations in the tuning band, i.e., the virtual channels, comprise a plurality of playlists, at least one of the playlists providing access to streamed digital files and at least one of the playlists providing access to locally archived digital media files.

According to a still further embodiment, the user interface device includes a selection mechanism having a display screen with a tuning band presented on a linear dial. Tuning movement for the first virtual channel corresponds to positioning of an indicator on the linear dial to the first location corresponding to the first virtual channel. The linear dial further a plurality of sections, each of the plurality of sections corresponding to different categories in a primary level of a hierarchy relating to metadata for content of the digital media files. One or more of the sections is further subdivided into a plurality of subsections, each of the subsections corresponding to a second level of a navigation hierarchy at least one level below the primary level. At least one virtual channel and optionally a broadcast channel is accessed by tuning to a location in the tuning band associated with the respective virtual channel or the broadcast channel.

According to one embodiment, a user interface device in a portable media player is configured to group audio files into playlist collections and to access them from a tuning band presented on the portable media player. Tuning to a virtual channel location within the tuning band selects and preferably automatically begins rendering the digital audio content associated with the virtual channel in the tuning or virtual band. According to an optional alternative embodiment, an additional manual entry step such as pressing a second entry button is required to effectuate playback of the digital content associated with the virtual station.

According to a further embodiment, a method for recording and playback from a media player is provided. A first source having a digital media file is selected and assigned to a first of a plurality of presets. The contents of the digital media file are then assigned to memory storage in response to the selection of the preset. The first source is portable media located within an optical drive (e.g., a DVD player, a CDROM player, etc.) coupled to the media player or alternatively an internet streaming source accessible by the media player. In order to playback the digital media file, the method includes selecting the first preset; and rendering the digital content source for playback by accessing the memory storage and implementing hardware or software decoding techniques to render the digital media files.

According to a still further embodiment, a user interface device provides access to at least one of a plurality of digital content sources. The interface device is configured to catalog the plurality of digital content sources to correspond to a plurality of channels in a single integrated tuning band, the tuning band including streamed digital media files, archived files available in local memory or network storage, and broadcast sources. The device is configured to select one of the catalogued channels for playback by a tuning movement of an indicator to a location within the tuning band corresponding to the channel.

These and other features and advantages of the present invention are described below with reference to the drawings.

BRIEF DESCRIPTION OF THE DRAWINGS

FIG. 1A is a diagram illustrating a network having an interface for accessing content in accordance with one embodiment of the present invention.

FIG. 1B is a diagram illustrating a network having a remotely controllable interface for accessing content in accordance with one embodiment of the present invention.

FIG. 2 is a block diagram illustrating a configuration of a client computer in accordance with one embodiment of the present invention.

FIG. 3 is a diagram illustrating a user interface device in accordance with one embodiment of the present invention.

FIG. 4 is a diagram illustrating a portable media player having a user interface in accordance with one embodiment of the present invention.

FIG. 5 is a graphical depiction of a virtual channel in accordance with one embodiment of the present invention.

FIG. 6 is a detailed view of the virtual radio dial of the user interface of FIG. 4 in accordance with one embodiment of the present invention.

FIG. 7 is a flowchart illustrating a method of storing digital content to a preset in accordance with one embodiment of the present invention.

FIG. 8 is a flowchart illustrating a method of storing digital content to a dynamic playlist in accordance with one embodiment of the present invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

Various embodiments of the present invention provide a virtual broadcast band user interface resembling a radio dial arrangement for accessing digital files and streams. The user interface maps archived or streamed digital files to virtual channels in a virtual broadcast band (tuning band) to simplify navigation.

Conventional radio tuners have included a tuning control for scanning the frequencies within the band. In some cases, this has included a scan button that allows the scanning of the available radio channels within the frequency spectrum covered by the radio receiver. Further conventional refinements have included preset buttons, each associated with a single radio station. Activation of the presets had traditionally caused the receiver to tune to the station associated with the preset.

Instead of the conventional analog radio dial wherein manual scanning across the dial corresponds to increasing (or decreasing) frequencies, according to several embodiments, movement across the virtual band (the tuning band having virtual channels) is tantamount to sequential moves through stored channels. Each of the channels is a playlist of at least one digital file, either archived or live streaming files. As known to those of skill in the relevant arts, playlists include customized groupings of digital media files. The playlists, and hence the channels, may have a variable duration, from as small as a single track (such as an MP3 file) to as large as a live and continuous digital audio stream from an internet streaming source. Whereas convention tuners are limited to the frequency channels within the band, the virtual band of the present invention has no such constraints. Further, the channels within the virtual band need not be assigned to a single broadcast station but instead may include a combination of sources of various types, such as archived digital files, conventional broadcast stations, as well as internet streaming sources.

The user interface device in accordance with several embodiments further includes a preset interface having a plurality of preset selection devices to activate a plurality of preset channels. The preset selection devices are preferably configured to both assign a content channel to the preset and to enable playback of the assigned content channel in response to activation of the preset selection device. The preset selection devices are preferably buttons but the scope of the invention is intended to cover a wide assortment of selection devices, from "hard" buttons to "soft buttons" and to screen sensitive, i.e., "touch-screen" techniques and devices. In accordance with one preferred embodiment, the system interface is configured to provide user access to one of a plurality of digital content sources as well as analog sources by associating the sources or a combination of them to each of a plurality of available presets accessed from the system interface.

The system in accordance with one embodiment of the present invention preferably comprises a source for digitally encoded audio files, a user interface, and an audio rendering device. The source for the digitally encoded audio files may be local to the user interface or remote (with any type of communication method used to connect the source to the user interface). Further, the user interface device may be communicating simultaneously with multiple sources, from multiple locations.

Using the virtual broadcast band user interface and techniques, navigation and access to an entire collection of digitally encoded audio files is performed by treating the collection of files and live sources as a group of virtual radio stations, i.e., virtual channels. This allows the user to use a simple and familiar radio paradigm to search for and render the collection of digitally encoded audio files. Preferably, the individual digitally encoded audio files are catalogued into playlist collections that are tantamount to a virtual broadcast station or virtual channel. By providing a selection mechanism in the user interface device using radio dial navigation techniques as described herein, filtering and access to the perhaps thousands of digital sources is simplified for the user. Preferably, the user selects a virtual channel or station by manipulating a selector on a tuning band or scale that is similar to a conventional radio band.

Non-limiting examples of a multitude of digital and analog file sources available for playback using a user interface device are provided in FIG. 1. In particular, the user interface device in these embodiments works with a client computer to coordinate and render some of the content sources. FIG. 1A is a diagram illustrating a network and client computer system with an interface for accessing content in accordance with one embodiment of the present invention. FIG. 1B illustrates an interface in an alternative system arrangement in accordance with another embodiment of the present system, the user interface employing a remote control for tuning of the virtual band.

The variety of sources of content are intended to be illustrative and not limiting. Shown in FIG. 1A is a user interface device 102 configured for access to a variety of content sources. For illustration purposes, the content will be described in terms of audio. It should be understood that the scope of the invention is not so limited but rather is intended to extend to all potential sources of content, including for example, video and digital still images. The digital still images may in one embodiment be presented in sequence to generate a streaming slide presentation.

Preferably, the user interface device 102 is in a form simulating a tuning interface mechanism known to consumers and presented in a table radio, portable media player, or the like and connected to a wireless local network 104 to access both a client computer 108 and an external network such as the internet 112. In accordance with the embodiments illustrated, the user interface device 102 is configured to provide wireless interconnection with the local network 104. Various wireless networking protocols are known to those of skill in the art and therefore complete details will not be provided here. For example, the wireless local network 104 may comprise one meeting the IEEE 802.11 family of wireless network standards. That is, the wireless network may meet any of 802.11a, 802.11b, 802.11e, or 802.11g specifications. Such networks typically use a wireless hub 106, i.e., a wireless access point router, to provide access to the Internet 112.

The configuration depicted provides access from the user interface device 102 to a client computer 108, for rendering digital files having various digital formats. The client computer 108 provides access to various streaming files on the Internet through the wireless hub 106. For example, thousands of radio stations are accessible through the Internet. These Internet broadcasts originate from streaming servers connected to the Internet. For example, servers 118 and 120 may provide streaming data, i.e., data such as audio or video in a streaming format for retrieval by client computer 108. Live broadcasts provide streaming audio (or video) in real time. Archived streams may also be accessed from the streaming servers connected to the Internet, such as servers 118, 120. In addition, the client computer 108 provides access to stored digital files, for example digital files stored on a hard disk memory device in client computer 108 or in media provided in an attached optical drive 110, such as, for example, a CD-ROM or DVD player. Preferably, the user interface device is configured with a decoding module containing software, firmware or other circuitry for rendering the digital content from the selected source. Alternatively, the client computer 108 contains the player software for rendering the decoding of the streamed digital content or the stored digital content.

Preferably, the system 100 is further configured to provide access to satellite and terrestrial broadcast content. Satellite radio generates live broadcast content to suitably configured decoding devices using satellite uplinks 126 and satellites 124. Satellite radio typically broadcasts in the United States in the "S" band spectrum (2.3 Ghz.) providing encoded digital content. The encoded audio is supplied with metadata regarding the audio, for example including the song title, artist, and genre of the music. According to one embodiment, the client computer 108 contains application software and hardware, such as provided on an add-on PCI card, to enable decoding and rendering of satellite broadcasts.

Entertainment content is also provided by terrestrial broadcast sources 122, for example, those in the AM, FM, or TV bands (i.e., UHF and VHF). Preferably, the user device is configured to access terrestrial broadcast bands either through the client computer 108 or directly by the user interface device 102. Add-on PCI cards having television and radio reception capabilities are known to those of skill in the art and therefore further details will not be provided here. Broadcast radio and television presently employs primarily analog transmission techniques and thus tuners may easily be incorporated entirely within the user interface device 102, including within small portable forms of the user interface device 102.

Digital broadcasting sources are also presently available, for example, including HDTV and SDTV broadcasts for video with accompanying digital audio output. The scope of the present invention is intended to extend to accessing such alternative digital broadcast sources without limitation.

Preferably the user interface device 102 further includes an audio out port 105. Audio outputs may take the form of any compatible connection for analog or digital output. For example, the connection may comprise a TOSLINK or coaxial digital connection for conveying digital audio signals to an audio reproduction device, for example a home stereo. Alternatively, the user interface device 102, in accordance with one embodiment, includes an audio amplification unit and speakers. That is, the user interface device may comprise a self-contained audio (or video) receiver and playback unit. Other content sources connected to the client computer 108 include an optical drive 110, such as a CDROM drive or a DVD drive. It should be understood that such external players may alternatively be directly connected to or contained with the unit encompassing the user interface device 102.

In order to manage and navigate through the plurality of content sources, the user interface device 102 preferably includes a virtual band presentation (tuning band) and a preset interface. Tuning through the tuning band having virtual channels (the virtual band) or selecting a preset in the preset interface enables the accessing of channels without traversing layers of metadata. The preset interface is provided on the user interface and is configured to assign channels to preset selection devices and to access the channels in a simplified manner. In one embodiment, the assignment and access is coordinated through a series of preset buttons, preferably located on the front panel of user interface device 102. Further details as to the methods involved in assigning and accessing channels is provided in the description below, particularly as to FIGS. 3-5.

In accordance with an alternative embodiment, as illustrated in FIG. 1B, the user interface device 102b contains the audio rendering module, i.e., the hardware, software or firmware required for decoding and converting for playback the digital signals, such as stored MP3 files or streamed digital files. Further, the user interface device 102b is preferably configured to include a tuner for one or both of the satellite and terrestrial broadcast signals, including decoding circuitry for decoding the compressed satellite broadcast signals.

According to this embodiment, the user interface device 102b is further configured with an infrared receiver, for receipt of infrared signals generated by an infrared remote control 130. Preferably, the remote control 130 is configured with a tuning control, such as a scan activator, and a plurality of preset buttons, to respectively scan the virtual band and enable selection of presets or favorite buttons, resulting in the automatic playback of the selected virtual channel associated with the preset. That is, many or all of the functions available from the user interface device 102b are available from the remote control device 130.

It should be noted that the user interface device 102b need not be connected to a client computer 108b. That is, the user interface device may be configured with circuitry for direct connection to the internet such as with a modem or network interface device for direct wired or wireless connection to the internet. Details as to such technology, for example as used in providing network connectivity for PDA's is known to those of skill in the relevant arts and hence complete details will not be provided here. In accordance with yet another embodiment, digital media files may be accessed from a second portable media player such as an MP3 player by providing a USB link from the user interface 102a or 102b or host computer, such as via a USB port on the user interface or on the client computer 108.

FIG. 2 is a block diagram illustrating a client computer 108 adaptable for use with the user interface device as illustrated in FIG. 1. More specifically, the client computer 108 may store or provide access to archived digital files stored locally or over a network. For example, archived files in the format of MP3, Windows Media Audio (WMA) or other known or future formats may be stored on hard disk drive 204 or accessed from an external server, such as located on a local network or the internet by interfacing with a network interface card 216 or wireless interface card 219. Alternatively, storage of digital audio files, including archived streaming files, may be accessed from an external storage device, for example those connected using a USB (Universal Serial Bus) port 218. For a non-limiting example, this port 218 may be used to access tracks stored on a hard drive or flash memory of a separate portable media player, such as an MP3 player. Digital files may also be stored on removable media inserted into optical drives, such as CD ROM drive 212 or DVD drive 210. Interconnection between the various modules, cards, and peripherals for the client computer is enabled using a system bus 202 and communication interfaces 232. Details as to interfacing devices with busses are known to those of skill in the arts and hence further details and illustrations of interfaces for the various peripheral devices shown are not provided here.

Other sources of content accessible through the client computer include terrestrial broadcast signals, such as TV, AM, or FM and Satellite broadcast signals. PCI cards containing over-the-air television/radio receiver modules 208 are capable of providing either or both of analog and digital television reception and are suitable for interconnection with a personal computer. These are known to those of skill in the art and therefore further descriptions as to functioning details will not be provided herein. Satellite broadcasts may also be received using PCI satellite radio receiver cards 214. For example, these cards may be capable of receiving Sirius Satellite Radio or XM Satellite Radio in the United States or comprise a DAB satellite card capable of receiving DAB signals as well as digital audio signals. DAB is a satellite system predominant in Europe for receiving satellite radio broadcasts.

The client computer 108 further includes a central processing unit (CPU) 220, and memory modules such as random access memory (RAM) 226, and Read Only Memory (ROM) 224, the memory modules preferably configured for respectively storing data and program code. Interaction with the client computer 108 is provided by a combination of a mouse 228 or similar interface device and a keyboard 230. Of course, when a user interface device for playback of audio is coupled to the client computer 108, control functions may be transferred to the interface device and/or its remote control.

FIG. 3 is a diagram illustrating a user interface device 300 in accordance with one embodiment of the present invention. Preferably the user interface device is configured to provide access to a plurality of digital sources. For example, the user interface device may be placed to access a network, such as in the placement of user interface device 102 illustrated in FIG. 1A. The scope of the invention is intended to extend to all forms of digital content including streaming, broadcast, and archived (local or other) sources. In one embodiment, the user interface is configured to provide access to analog content sources either alone or in conjunction with digital content sources.

The user interface device may, in one embodiment, take the form of a table radio, configured with a tuning mechanism that functions to tune a virtual broadcast channel from the available virtual broadcast channels in the tuning band. Rather than conventional radio dials or scales providing frequency markings corresponding to the frequency channels of the frequency band, the dial is user customizable, as are the intervals and the meanings attributable to those intervals.

In one preferable embodiment, the tuning mechanism comprises a linear virtual broadcast band similar to a radio dial, but having various classification identifiers distributed across the scale. Instead of presenting various frequency designations at various points of the frequency band represented by the radio dial or scale, customized categories can be defined. For example, for a user having diverse musical interests, the breadth of the dial can encompass musical genres and sub genres ranging from classical music to reggae. Moreover, the progression may be user defined. Hence, as the user tunes across the dial representation of the virtual band, for example from left to right, the tuning movement may correspond to a change in mood from mellow to rollicking and hence traverse corresponding styles of music.

The virtual broadcast band user interface preferably treats the entire collection of digitally encoded audio files as a group of virtual radio stations or virtual channels. This allows the user to use a simple and familiar radio navigation technique to search for, access, and render the collection of digitally encoded audio files accessible to the user interface device. Preferably, the storage method groups the individual digitally encoded audio files into playlist collections. In one embodiment, these playlists are fixed and limited to a specific group of audio files. In another embodiment, the playlists include collections built dynamically based on various selection criteria (like past listening history, genre, tempo, etc.). Preferably, each playlist collection is a virtual broadcast band or virtual channel, the virtual band comprised of a plurality of virtual broadcast stations (i.e., virtual channels).

In one embodiment, in order to scan across the virtual band, "up" and "down" scan buttons 302, 303 are provided. These operate by, for example, scanning in a first direction and its opposite when respectively activated, i.e., they implement "tune up" and "tune down" functions. More preferably, a "seek" button 304 is also provided. When the user navigates among the archived and streamed files available for playback using the rendering module, the user interface acts in a similar fashion to an AM or FM radio interface. For example, selecting the 'Scan Station' or 'Seek" function on an FM radio will begin searching for the next strongest radio signal. In similar fashion, the digitally encoded audio user interface will select the next playlist collection and begin rendering it (playing it), when the 'Seek" function 304 is selected. This enables the tuning across the virtual band to playback the next "strongest" virtual band station (virtual channel). With conventional radio tuners, "strength" refers to a signal meeting a certain threshold of clarity and/or power. In the context of the user customizable virtual bands of the embodiments of the present invention, the next strongest signal is preferably identified as the next virtual channel exceeding a predetermined threshold. In other words, the "seek" button operates to provide a presentation of a subset of the virtual channels available, i.e., the virtual channel band further filtered. This level of filtering is preferably customizable by the user.

The filtering such that the seek function stops on a subset of the available virtual channels is broader than the narrow filtering provided by the tuning of a particular virtual channel. For example, the virtual band may comprise arrangements of playlists by genre, for example eight different genres as the virtual band is scanned. A particular user may express a higher preference for 3 of those genres. Hence, activating a seek button will cause the playback (i.e., virtual tuning) of the next virtual channel exceeding this virtual "strength". That is, those playlists associated with genres wherein the user has expressed a higher preference are selected. In this way, navigation to both streaming and archived tracks is simplified and presented in a manner familiar to users of conventional radio tuning.

Tuning is preferably performed by selecting the 'Scan Up' 302 or 'Scan Down' 303 function. Selecting one of the 'Scan Up' 302 or 'Scan Down' 303 functions results in a move across the virtual band to the next/previous playlist collection, and preferably begins rendering it automatically, much like tuning using a conventional AM/FM radio tuning interface. In the process of the tuning movement, the virtual channels are presented sequentially and preferably played back automatically in response to the tuning movement to the location corresponding to the respective virtual channel. In preferred embodiments, the user interface will display the name of the playlist collection that is currently being rendered, in addition to the name of the digitally encoded audio file that is playing. According to alternative embodiments, tuning to the location in the tuning band corresponding to the virtual channel desired results in information for the channel being displayed. Playback requires an additional manual step in this alternative embodiment, such as, for example, depressing an additional button.

Preferably, the user interface includes a virtual band display screen 301 to indicate the parameters of the virtual band, with individual markings indicating channels within the virtual band. As noted, the virtual band is user customizable. Preferably, the virtual band presentation comprises a tuning band displayed on a display screen 301 of the user interface device 300. For example, the virtual band may be depicted using a liquid crystal display (LCD) screen. Alternatively, the virtual band may be represented by an alphabetical list and a device to move a pointer across the list. Any of a dial, touch pad, scroll wheel, etc. are suitable for navigating down or across the list. Using an LCD screen or similar display device provides a screen that may be easily modified or customized by the user.

The scope of the invention is intended to extend to all alternative methods of presenting the virtual band information. For example, a rotary tuning dial linked with and configured to present the channels seriatim is also intended to also fall within the scope of the present invention's embodiments. That is, the scan up or tune up function may be represented by turning the rotary dial in one direction, for example, clockwise. The scan down or tune down function may likewise be represented by turning the rotary dial in the other direction, e.g., counterclockwise.

The user interface device 300 may include an external audio port or self-contained speakers 312 to play back the rendered digital audio as well as audio from conventional analog sources. User interface device 300 is also preferably configured to use presets 310 to access digital content. Presets allow the management of digital content by helping the users avoid iterating through various hierarchical levels of metadata. In specific, presets act as filter to provide easy access to frequently used material. In one embodiment, the presets are configured such that they may be assigned to a virtual channel by activating the particular preset button for a duration exceeding a predetermined threshold. That is, a preset button 310 may be depressed for several seconds while the virtual channel (i.e., the selected playlist) is playing, hence assigning the virtual channel to that preset. Alternatively, presets may be assigned by other methods known to those of skill in the art, for example by activating an "append" button 306, followed by the preset, thus appending the playlist to the virtual channel(s) already assigned to the preset. Further details as to assigning and using the presets are provided below in the description relating to FIG. 7.

According to one embodiment, the user interface (such as those illustrated in any of FIG. 1A, 1B, 3, or 4) could also access files archived in a second MP3 player "storage", for example, the on-board storage of either a flash or hard drive based MP3 player. The user interface would preferably receive the archived files from the 2nd MP3 player by an IEEE 802.11 connection (WiFi) or USB connection or any other suitable connection for transmitting digital files from one portable device to a second portable device. For example, a USB jack 320 may be located on the front of the table top user interface device 300 illustrated in FIG. 3. Preferably, the USB connection is configured in a USB OTG (on-the-go) protocol, a version of the USB standard that enables portable devices to connect and communicate. With the OTG technology, a portable player with USB OTG can act as the host and communicate with other non OTG USB devices.

FIG. 4 is a diagram illustrating a portable media player using an interface in accordance with another embodiment of the present invention. Although a client computer is shown in FIG. 1 to provide convenient hookup and access to files stored on the user's hard drive or other local memory as well as providing access to the internet, the functioning of the user interface is not dependent upon hookup to a client computer to access stored files or to access the internet. For example, various wireless protocols are well known whereby portable electronic devices may access the internet without reliance on conventional personal computers. These connection technologies include Bluetooth, a short-range wireless connectivity technology used as a cable replacement for mobile phones, handheld PCs and other peripheral devices. Further examples include transmission over digital cellular networks. For example, GSM ("Global System for Mobile Communications") networks use GPRS (General Packet Radio Service) data transmission techniques. This enhancement for GSM networks adds packet-switching protocols and shorter set-up time for ISP connections. Specific access to the internet by cellular phones is typically governed by WAP (Wireless Application Protocol) standards. This set of protocols standardizes the manner in which wireless devices, such as cell phones and some PDAs, are able to access parts of the Internet, such as the worldwide Web. Further details as to implementing wireless internet access from portable devices are known to those of skill in the relevant arts and hence further details will not be provided herein. In any of these ways or other methods known to those of skill in the art, portable media players such as user interface device 400 may access streaming media files from networks.

The portable media player 400, i.e. a user interface device, is preferably configured in a similar manner to that of the user interface of FIG. 3. That is, tuning is performed using a virtual broadcast band, i.e., a tuning band having virtual channels, and in addition, presets. The virtual broadcast band may be displayed on display screen radio dial 422 and further configured such that the virtual channels may be assigned from a plurality of sources, each of the virtual channels potentially corresponding to a combination of sources.

For example, one virtual channel 401, shown as assigned to preset 1, includes digital files from a local memory storage device 407, for example a hard drive or flash memory integrated within the portable media player 400. A second virtual channel 402 and its preset 2 correspond to a live satellite broadcast 408, available from a digital satellite radio broadcast receiver integrated into the portable media player. A third virtual channel 403 (assigned to preset 3) corresponds to an internet radio station 409 providing live streaming audio. A fourth virtual channel 404, assigned to preset 4, is configured to provide a virtual channel that includes content from a combination of content sources. In this case, the sources include an internet streaming station 411, a first terrestrial radio broadcast station 412, and a satellite broadcast station 413. A fifth virtual channel 405 (assigned to preset 5) includes a combination of a digital archived file 416, a first internet streaming source 417, a second internet streaming source 418, and a digital archived file (or files) 419. Hence, when the virtual channel 405 is selected, either by selecting the preset or by tuning using the seek 426 or scan 424 functions, the audio playback will proceed through a sequence of a digital file (e.g., MP3) or playlist of digital files, streaming audio from a first internet source, streaming audio from a second internet source, and a second collection of archived digital files.

Preferably, the digital archived files are stored in local flash memory or a hard drive 440 (non-volatile memory) located within the portable media player. The number of virtual channels accessible using the presets is limited by the number of presets available whereas the number of virtual channels accessed by tuning is preferably greater. That is, by using a scan up or down button 424, a seek button 426, or some alternative tuning mechanism such as a rotary dial or direct entry of a virtual channel, the number of accessible virtual channels can be much greater than those available using presets. In accordance with one embodiment, direct entry comprises associating a numeric ID with a channel or associating a channel name with a channel. By entering the numeric ID or the channel name, tuning to the particular broadcast channel is readily achieved. The scope of this and all embodiments disclosed are intended to encompass all suitable methods of tuning to a location within the tuning band such as including all alternative methods of tuning to a particular channel disclosed herein.

According to one embodiment of the invention, the sensitivity of the virtual band increases as the number of "stations" available increases. The number of virtual channels need not be constrained to the resolution available from the display screen 420, but rather the device may be configured for automatic rendering and playback of sequential channels in response to user initiated tuner movement within the virtual band, even to playback of channels in a tuning band wherein each visible location within the tuning dial of the tuning band is not uniquely associated with only one virtual channel (virtual station). That is, the number of virtual channels is preferably not to be limited by the available display screen resolution. Of course, the scope of the invention is also intended to extend to configurations wherein the virtual channel might be identifiable from at least a location on the display screen 420, i.e., a unique location in the visible tuning dial of the tuning band corresponds to a unique virtual channel (virtual station).

Internet streaming locations may be accessed by any of several alternative methods. For example, the location (i.e., uniform resource locator "URL") may be prestored to a particular preset or alternatively set to a preset via a radio station catalog. That is, radio station catalogs are configured to provide a listing of internet radio stations that the user can access. The catalog is preferably configured to include URL's for the streaming audio for each radio station. The software application is configured to extract the URL's from the catalog and store them in the presets, i.e., associate them with a preset. According to yet another embodiment, the user manually enters the IRL for an internet streaming location. In a preferred embodiment, when the user is using the virtual band, internet streaming audio may be made indistinguishable from the local content.

Preferably, the portable media player 400 provides not only the user interface for navigating the accessible digitally encoded files but also an audio rendering device. As discussed above, the sources for the digitally encoded audio files may be local to the user interface or remote with any type of communication method used to connect the source to the user interface. Moreover, the user interface may be further configured to communicate with multiple sources simultaneously. Hence, the virtual channels accessible using the navigation techniques described herein may access different sources as the virtual band is traversed or even as the playback proceeds on the currently playing virtual channel.

Navigation by tuning of the virtual broadcast band treats the entire collection of digitally encoded audio files as a group of virtual radio station or virtual channels. This allows the user to use a simple and familiar radio paradigm to search for and render the collection of digitally encoded audio files. Preferably, selection of one of the virtual channels in the band results in the automatic rendering (i.e., playback) of the digitally encoded files or streams corresponding to the virtual channel. That is, tuning to the location in the tuning band corresponding to the virtual channel results in the selection and automatic rendering of the digital media files associated with the virtual channel. Rendering is preferably performed using the rendering module 439, including in one embodiment a processor 436 and ROM memory 438 configured to decode the anticipated coding of the digital files.

Preferably, the individual digitally encoded audio files (streamed or archived) are grouped into playlist collections. Playlists provide a logical relationship to group related audio files such that the entire list of files can be easily referenced. According to one embodiment, the playlists are fixed and limited to a specific group of audio files. Alternatively, the playlists are built dynamically based on various selection criteria (like past listening history, genre, tempo, etc.). Each of these playlist collections becomes a virtual channel, i.e., a virtual broadcast station. Playback of the rendered digital files is preferably provided using an external audio reproduction unit connected to external audio port 430, such as earphones 432.

FIG. 5 is an exemplary time scale representation illustrating digital content assigned to a virtual channel in accordance with one embodiment of the present invention. In specific, example details of virtual channel 405 depicted in FIG. 4 are graphically illustrated. When virtual channel 405 is accessed, the portable media player or other interface device is configured to initially access the playlist 504 comprising archived digital files 511-515. The playlist can be as short a single digital file, such as a single MP3 track or alternatively comprise a plurality of tracks 511-515. Once playback of playlist 504 is completed, the user interface device is configured to render digital content originating from the internet, i.e., internet stream 506. Once the rendering of digital content from the first internet stream 506 for the predetermined duration is complete, internet stream 508 is accessed. Following playback of this source for the predetermined duration a playlist 510 comprising an archived digital file 518 is accessed. Associating or implementing a virtual channel may be effectuated in any of a variety of ways. For example, the virtual channel may be mapped to a regular playlist that contains local digital files, to URL's for internet streaming audio, or as a further example tracks from a CD in a CD-ROM drive. These examples are intended to be illustrative and not limiting as to the scope of the present invention.

It should be understood that playback of archived digital files is not limited to playback of a group of tracks stored together. Playing archived music may comprise accessing a playlist. Playlists often include tracks stored at various separated locations but all are logically related. Using metadata associated with each of the plurality of tracks permits access to the individual tracks when the playlist is selected, in accordance with techniques known to those of skill in the relevant arts.

The foregoing provides examples of the ordering of a virtual channel. It should be appreciated that the scope of embodiments of the present invention are intended to extend to user interfaces using any form of virtual channels, to include virtual channels solely comprising of archived digital files, to internet streaming sources, and to terrestrial and satellite broadcasts used in combination with any other source of streaming or archived digital files.

FIG. 6 is a detailed view of the virtual broadcast band display of FIG. 4 in accordance with one embodiment of the present invention. The virtual broadcast band display screen 420 includes a linear dial 610 having periodic markings dividing the span of the dial. Preferably, the markings are used to indicate progression along the virtual broadcast band or tuning band. That is, tuning along the virtual broadcast band provides a filtering of the content to render a single source for playback. Preferably, an indicator is used to indicate the currently rendered content, just as a conventional radio uses a dial indicator to indicate the frequency of the "tuned" station. Rather than providing frequency markings on the linear dial, which to many users offer no inherent usefulness other than aiding navigation at the expense of cluttering the process, the dial markings and the significance of progression across the span of the virtual band are user customizable. Preferably, a respective specific location on the tuning band corresponds to each virtual channel.

For instance, the locations of the dial markings on the victual linear dial may be associated with music genres and subgenres, as indicated by labels 602-608, representing respectively reggae, country, rock, and acid rock genres in corresponding sections of the dial. In this way, a user could tune in to reggae virtual broadcast stations by ensuring that the dial indicator 612 is tuned to the low end (e.g. left) of the linear dial 610. Similarly, the user could tune to acid rock virtual broadcast stations at the high end of the linear dial 610. In this example, progression from left to right across the linear dial corresponds to an increase in intensity of the music. This example is intended to be illustrative and not limiting.

This provides a simplified and improved user navigation. Thus, for example, a user can locate several reggae stations at the left end of the linear dial as compared to conventional radio broadcast tuning wherein a user would need to know the frequencies of the stations broadcasting reggae genre music, and to jump back and forth across the dial in order to respectively provide a tuning movement to those stations. For example, with the conventional radio dial, a user might need to tune an FM radio dial to 93.1 for the a favorite reggae station and to 102.5 for a second reggae station, and to 97.3 for a $3^{rd}$ least preferred reggae radio station, and in the process tune past other stations broadcasting other genres, talk radio, news, sports, etc.

With the embodiments of the present invention, filtering is completely user customizable. That is, the significance of the progression across the linear dial, the labels associated with different portions of the dial and the markings, as well as the ordering within a sub-band of the dial may be customized to provide the filtering level desired by the user. For a further example, within the sub-band corresponding to the reggae genre 602, the user may choose to order the reggae virtual channels (i.e., virtual broadcast stations) from the most to the least favorite. Alternative or additional user customization includes basing the tuning on alphabetical arrangements of genres or artists or combinations of the two. The foregoing is intended to be exemplary and not limiting.

Multiple levels of filtering can accordingly be provided. For example, the metadata pertaining to content of the digital media files may be used to create a hierarchy of information to be used in ordering the virtual channels in locations within the virtual band. Thus, for example, genres forming a primary level of metadata hierarchy can then be subdivided into artists within the corresponding primary level genre (e.g., section of the virtual band), the subdivisions corresponding to a second level of the metadata hierarchy beneath the primary level. Moreover, in one embodiment, the filtering is configured such that alternative views are made available to the user. That is, one view includes a first multiple level filtering, for example, genre-artist-album and a second view includes a second multiple level filtering such as genre-tracks.

In one embodiment, the virtual channels, for example as represented by markings 614-616, may be accessed directly from the first level of the hierarchy, and thus the interface presentation closely resembles an AM or FM radio interface.

In accordance with another embodiment, the virtual radio band or dial may be arranged such that as the indicator sweeps across the dial the channels accessed correspond to continents for the sources of the music, for example starting with North American music proceeding from American music to the music of Mexico, South America then to Europe, Africa, and Asia. Thus, instead of the radio dial showing the frequencies, the virtual band shows information arranged in a more user friendly and informative ordering.

One source of digital content includes portable media such as CD's and DVD's playable on optical drives. For example, such content may be accessed through optical drives 110 as illustrated in FIGS. 1A-1B. Further, optical drives may be connected to the user interface device's line in port 434 as illustrated in FIG. 4. While the user interface may be configured to access the particular CD or DVD in the optical dive, alternative approaches include storing the favorite CD's to a hard drive located within the unit, assigning the CD's to a virtual channel and/or preset, and playing back those tracks by pressing a preset button or tuning to the virtual channel. Alternatively, the digital content derived from the CD's may be stored at any memory location within the system illustrated in FIG. 1, for example, the hard drive may be located within the client computer (PC) 108*b*, another personal computer (PC) (not shown), or a network drive such as located within or accessible by the servers 118. Rather than using a computer centric process for ripping and storing the audio content, i.e., using software programs on a client computer to decode the PCM digital files on the CD, encoding them into an alternative digital format, and storing them on a hard drive, preferred embodiments of the present invention use a more user friendly process based on presets or virtual channels to provide the virtual equivalent of a CD changer.

FIG. 7 is a flowchart illustrating a method of storing digital content to a preset in accordance with one embodiment of the present invention. Initially, in operation 702 the source is selected. For example, a CD or other portable media is inserted into the optical drive for playback by the rendering module of the portable media player or other user interface device. While the CD tracks are playing, the user preferably determines in operation 704 the preset button intended to correspond to the CD's collection of tracks. Next, in operation 706, the tracks associated with the CD are saved by pressing and holding the preset button for an extended length of time. That is, the saving to the preset occurs by depressing the preset for a period in excess of a predetermined threshold, for example a period greater than or equal to 3 seconds. By doing such, the process of converting the CD to data automatically commences. For example, for storing compressed digital data, the CD may be ripped, encoded, and stored onto the hard drive or flash memory of the interface unit. Alternatively, the data may be stored on an external hard drive or memory, for example, in the computer over the network. The method then ends in operation 708.

When this 'Save Preset' function is activated, the rendering device saves the actual digitally encoded audio data to a storage device and adds a playlist collection (of the CD) to the preset short-cut. This allows the rendering device to act like it had a virtual CD changer built-in. To re-play the stored audio stream, the user would just quickly 'press and release' the 'preset button'. The description of the CD source is intended to be illustrative and not limiting. The techniques and hence the scope of the invention extend to other content sources. For example, an audio stream may likewise be recorded to one or more presets. This method involves 'pressing and holding' a 'preset button' for a period in excess of the predetermined threshold. When the button is released, the currently playing audio stream is recorded. Setting presets may alternatively involve association of the preset button to a collection of digital content without actual recordation of the source material. As discussed above, for example, URL's (i.e., internet addresses) may be associated with the preset. Further other "live" sources such as broadcast, satellite, media players having removable media, may be assigned to the preset such that the corresponding digital content that is now playing is accessed by depressing the preset for playback.

Various embodiments access digitally encoded files by grouping them into playlists. As discussed above, the playlists can be fixed, i.e., limited to a specific group of audio files or they could be formed in a dynamic fashion, based on various selection criteria (e.g., past listening history, genre, tempo, etc.). Metadata, i.e., data about data, may be used to identify relevant information about the digital content and hence to create dynamic playlists or dynamic virtual channels. For example, metadata associated with music tracks often includes information such as track title, artist name, and genre. Digital audio content formatted in the MP3 format store metadata in ID3 tags included in the MP3 file. This metadata can be used to create a virtual channel whose content changes over time. FIG. 8 is a flowchart illustrating a method of associating digital content with a dynamic playlist in accordance with one embodiment of the present invention.

Initially, in operation 802, attributes for a virtual channel (playlist) are identified. Next, in operation 804, metadata for a predetermined group of digital content is examined to determine its similarity to the attributes for the virtual channel. The selection criteria for the dynamic playlists can include a broad variety such as past listening history of the user, genre, tempo, etc. If the metadata matches the selected criteria for the virtual channel, the identified content is added to the virtual channel in operation 806.

In operation 808, the content for the virtual channel is played back. The process ends at operation 810. This method can be used to generate and play back a dynamically changing playlist. For example, in one embodiment, a dynamic playlist is defined and configured to access ten random rock tracks each time the virtual channel (e.g., playlist) is accessed. Provided that the accessible memory has more than ten rock tracks (i.e., tracks having metadata identifying the tracks as rock tracks), each virtual channel access may result in different rock tracks in different orders. Thus, accessing a virtual channel configured as a dynamic playlist may result in generation of digital musical content having a changing ordering of music associated with a particular genre, in ways similar to the generation of music by some radio stations. This changing order is played back By exposing the user to the digital content sources using a radio-like navigation experience, the user can obtain a customized experience, i.e., an experience customized to the needs of the user as opposed to selecting from a finite list of radio stations. Here, the user can select from a plurality of virtual broadcast stations, each of which is suited, configured, and filtered for that user. By replacing the conventional radio dial movement across a spectrum of frequencies with navigation across a user defined spectrum of playlists (virtual channels), increased efficiency in navigation is provided.

The foregoing description describes several embodiments of a user interface device employing virtual channels and a virtual band for navigating through digital content files. While the embodiments describe details of digital content sources, the invention is not so limited. The scope of the invention is intended to extend to user interface devices capable of also accessing analog content sources, such as including AM, FM, or analog television sources. By configuring a user interface device in accordance with the embodiments described, a simplified navigation experience may be provided to access various content sources, such as digital, analog, or a combination of them from a portable media player, a computer, or any form of a user interface device. Further, the digital media files and content are not limited to audio. The content may include any digital content, including but not limited to video and sequences or collections of images without departing from the scope of the embodiments of the invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A device comprising:
a physical processor configured to associate a plurality of digital media files with a playlist, the playlist being associated with digital media files determined, via examination of metadata, to have attributes similar to the attributes for digital media files associated with the playlist based on selection criteria, the selection criteria including one or more of the following: past listening history, genre, or tempo,
wherein the physical processor is further configured to begin playback of the playlist,
wherein the physical processor is further configured to, after playback of the playlist is completed, automatically find and retrieve digital media files originating from two different sources, the two different sources including local storage and the internet, the retrieved digital media files being determined to have attributes similar to the attributes for digital media files associated with the playlist based on the selection criteria, the determination being made via examination of metadata,
wherein the physical processor is further configured to automatically render and playback the digital media files associated with the playlist as part of the playlist in response to selection of the playlist.

2. The device in claim 1, further comprising a user interface for selection of the playlist.

3. The device in claim 2, wherein the user interface is configured to communicate with multiple sources simultaneously.

4. The device in claim 1, wherein the playlist is built dynamically upon selection.

5. The device in claim 1, wherein the digital media files include digital audio files.

6. The device in claim 1, wherein the digital media files are accessed from at least one of a hard disk drive, a flash memory module, an optical drive, a terrestrial broadcast source, a satellite radio broadcast source, and an internet server source.

7. The device in claim 1, wherein the digital media files associated with the playlist are accessed from at least three different sources.

8. A method comprising:
associating, by a processor, a plurality of digital media files with a playlist, the playlist being associated with digital media files determined, via examination of metadata, to have attributes similar to the attributes for digital media files associated with the playlist based on selection criteria, the selection criteria including one or more of the following: past listening history, genre, or tempo;
beginning playback of the playlist;
after playback of the playlist is completed, automatically finding and retrieving digital media files originating from two different sources, the two different sources including local storage and the internet, the retrieved digital media files being determined to have attributes similar to the attributes for digital media files associated with the playlist based on the selection criteria, the determination being made via examination of metadata; and
automatically rendering and playing back the digital media files associated with the playlist as part of the playlist in response to selection of the playlist.

9. The method in claim 8, wherein selection of the playlist is accomplished via a user interface.

10. The method in claim 9, wherein the user interface is configured to communicate with multiple sources simultaneously.

11. The method in claim 8, wherein the playlist is built dynamically upon selection.

12. The method in claim 8, wherein the digital media files include digital audio files.

13. The method in claim 8, wherein the digital media files are accessed from at least one of a hard disk drive, a flash memory module, an optical drive, a terrestrial broadcast source, a satellite radio broadcast source, and an internet server source.

14. The method in claim 8, wherein the digital media files associated with the playlist are accessed from at least three different sources.

15. A system comprising:
a user interface;
a network interface coupled to a network, the network interface configured to access at least one digital streaming source from a network server and a digital file stored on a client computer;
memory; and
a physical processor configured to associate a plurality of digital media files with a playlist, the playlist being associated with digital media files determined, via examination of metadata, to have attributes similar to the attributes for digital media files associated with the playlist based on selection criteria, the selection criteria including one or more of the following: past listening history, genre, or tempo,
wherein the physical processor is further configured to begin playback of the playlist,
wherein the physical processor is further configured to, after playback of the playlist is completed, automatically find and retrieve digital media files originating from two different sources, the two different sources including local storage and the internet, the retrieved digital media files being determined to have attributes similar to the attributes for digital media files associated with the playlist based on the selection criteria, the determination being made via examination of metadata,
wherein the physical processor is further configured to automatically render and playback the digital media files associated with the playlist as part of the playlist in response to selection of the playlist.

16. The system in claim 15, wherein the user interface is configured to communicate with multiple sources simultaneously.

17. The system in claim 15, wherein the playlist is built dynamically upon selection.

18. The system in claim 15, wherein the digital media files include digital audio files.

19. The system in claim 15, wherein the digital media files are accessed from at least one of a hard disk drive, a flash memory module, an optical drive, a terrestrial broadcast source, a satellite radio broadcast source, and an internet server source.

20. The system in claim 15, wherein the digital media files associated with the playlist are accessed from at least three different sources.

* * * * *